Dec. 28, 1926.

B. F. MUSSER

CHEESE CUTTER

Filed April 21, 1926

1,612,305

Inventor
Benjamin F. Musser.
By Smith & Michael,
Attorneys.

Patented Dec. 28, 1926.

1,612,305

UNITED STATES PATENT OFFICE.

BENJAMIN F. MUSSER, OF RISON, ARKANSAS, ASSIGNOR TO THE NATIONAL SANITARY FOOD MACHINE COMPANY, OF LITTLE ROCK, ARKANSAS.

CHEESE CUTTER.

Application filed April 21, 1926. Serial No. 103,470.

My invention relates to cheese cutting cabinets and has particular reference to an improved cheese cabinet embodying means for normally covering the cheese, and novel means for conveniently and accurately cutting the cheese into pieces of the desired size.

The object of my invention is to provide a cheese dispensing cabinet comprising a movable cutter, means for operating the cutter, and a movable protective cover for the cheese which is simultaneously raised and lowered with the movement of the cutter.

A further object of my invention is to provide an improved cheese cutting and dispensing cabinet in which a vertically reciprocable knife is employed to cut or slice the cheese and in which the protective display cover normally covering the cheese is raised simultaneously with the downward or cutting movement of the knife so that the cut section of cheese may be conveniently and easily removed from the cabinet.

A further object of my invention is to provide novel means for normally supporting a transparent protective cover and for actuating the knife, and to so connect these two mechanisms that a single movement of the operating lever will effect the simultaneous movement of the knife and cover supporting means.

A still further object of my invention is to provide an improvement in cheese cutters of the type shown in my Patent #1,585,259, issued under date of May 18, 1926, that is simple in construction, reliable in operation and highly efficient for the purpose for which designed.

Figures 1, 2:
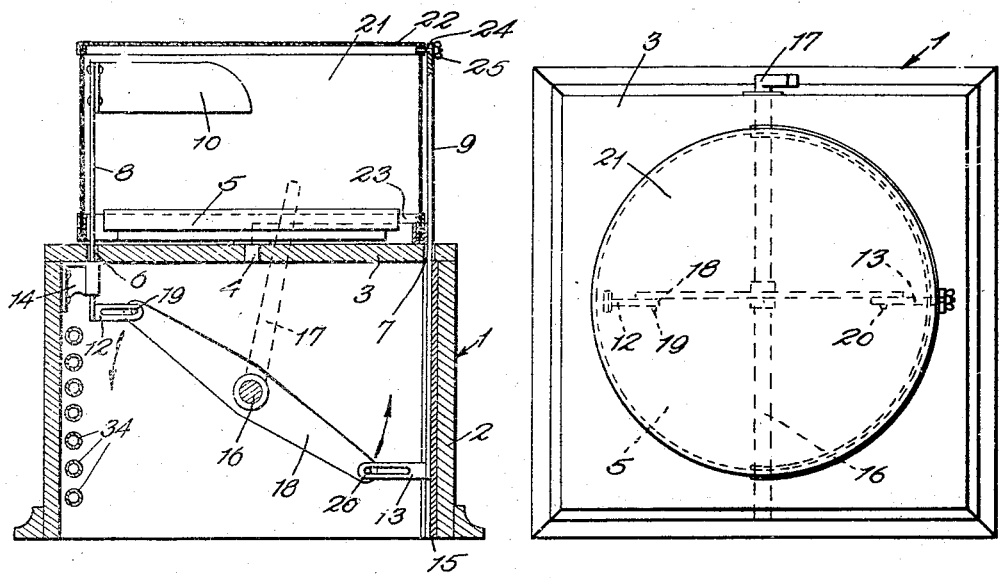
Figure 3:
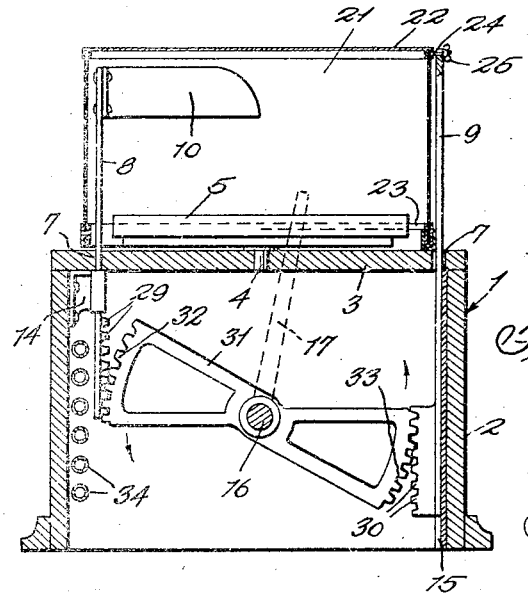
Figure 4:
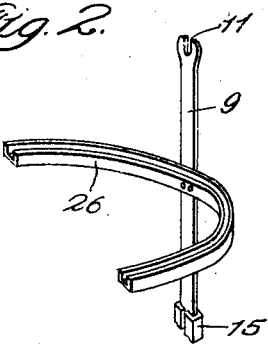
Figure 5:
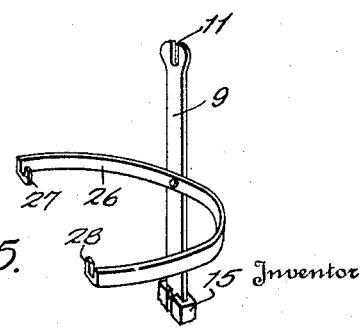

In the accompanying drawings forming a part of this specification and in which like numerals designate similar parts throughout the several views, Fig. 1 is a vertical sectional view through the preferred form of my invention, Fig. 2 is a plan view thereof, Fig. 3 is a vertical sectional view through a modified form of the invention, and Figs. 4 and 5 are fragmental prospective views of two forms of cover supporting means.

Referring to the drawing, wherein, for the purpose of illustration, is shown several preferred embodiments of my invention, the numeral 1 designates a cabinet having closed sides 2 and a top section 3, said top section being provided with a centrally located tubular bearing 4 for receiving the axially depending bearing pin of a cheese holding turntable 5. All of the above construction is shown in my Patent #1,585,259, issued under date of May 18, 1926, and forms no part of my present invention. It is intended that the movements of the cheese-holding turntable 5 be effected by suitable operating means, such for example, as that disclosed in my patent above referred to, although it is to be understood that any suitable operating means may be employed to effect the rotation of the turntable to present different size sections, to the cutter depending upon the weight or size of the piece desired.

Extending upwardly through suitable slots 6 and 7 in the cabinet top portion 3 at opposite sides thereof and beyond the peripheral edge of the turntable 5, are vertically-positioned bar members 8 and 9, the bar member 8 having secured at the top thereof a horizontal, inwardly-extending cheese-cutting blade 10, and the bar 9 having at its upper end an open slot or forked portion 11. The lower ends of the bars 8 and 9 are provided with horizontal inwardly-extending arms 12 and 13, respectively, each slotted throughout the major portion of its length. The bars 8 and 9 are adapted to reciprocate vertically through the slots in the cabinet top, such vertical reciprocation being guided by means of the guide block 14, secured to the inner side of the cabinet 1 near the top thereof and the guide strip 15 secured to the inner side of the cabinet.

A horizontal shaft 16 extends through opposite sides of the cabinet and has keyed or otherwise rigidly secured at one end beyond the side walls of the cabinet, an operating handle 17, whereby oscillation of said shaft is accomplished. About midway of the shaft 16 is keyed or otherwise rigidly secured a lever 18 extending on opposite sides of said shaft and having near its outer ends transversely extending pins 19 and 20 adapted to extend into the slots in the arms 12 and 13 respectively. It is thus obvious that oscillation of the operating handle 17 will cause a corresponding oscillation of the shaft 16 and lever 18, and, due to the pin-and-slot connection with the arms 8 and 9, will cause an opposed vertical reciprocation of such arms.

A cover 21 is provided which is of sufficient height to completely cover a head of cheese or other commodity resting on the turntable 5, said cover preferably having a transparent top and side walls whereby the head of cheese or the like is protected from dust and dirt, but still displayed in full view. The top and bottom edges of said cover are provided with metallic bindings 22 and 23 respectively, the binding 22 being provided with a radially-extending screw-threaded bolt 24 on which is threaded a clamping nut 25. The vertical bar 9 is provided with a horizontally-extending supporting member 26, preferably semi-circular in shape and either of channel form as shown in Fig. 4, or provided at its ends with notched inwardly-extending arms 27 and 28, as shown in Fig. 5. As best illustrated in Figs. 1 and 3, the lower open edge of the cover rests within the channel or notches of the supporting member 26, with the bolt 24 extending through the notch 11 in the bar member 9. The clamping nut 25 may be threaded on the bolt 24 and tightened until the cover assumes a true horizontal position.

In the form of my invention shown in Fig. 3, instead of employing the inwardly-extending slotted arms 12 and 13 and the operating lever 18, I provide the lower ends of the bars 8 and 9 with a series of inwardly-extending teeth 29 and 30, respectively. I replace the lever 18 by a segmental gear member 31, keyed or otherwise rigidly secured to the operating shaft 16 and provided on its periphery with arcuate sets of gear teeth 32 and 33 adapted to mesh with the racks or teeth 29 and 30, respectively.

If found desirable the base of the cabinet 1 may be provided with a series of cooling pipes 34 extending along one or more inner sides of the cabinet and connected to a suitable source of refrigerating fluid for circulating brine or other refrigerant through the said pipes or coils to cool the head of cheese or other commodity resting on the turntable 5.

Referring now to the operation of my invention and with particular reference to the form of the invention shown in Figs. 1 and 2, it is obvious that as the operating lever 17 is oscillated the cutter 10 will move downwardly toward the turntable 5 and will pass through the head of cheese or other commodity positioned thereon. Simultaneously with the downward movement of the cutter 10, the bar 9 and protective cover 21 carried thereby, are moved upwardly, thus uncovering the head of cheese or the like and permitting the operator to remove the severed slice just cut by the knife 10, from the turntable for delivery to the customer. After the slice has been removed, the handle 17 is returned to its former position, thus simultaneously raising the cutter blade 10 and lowering the protective cover 21 to the position shown in Fig. 1. The operation of the form of my invention shown in Fig. 3 is substantially the same, the only difference being that the oscillations of the handle are transmitted to the segmental gear member 31 and co-acting rack members 29 and 30, to cause the simultaneous opposed movements of the cutter and cover supporting bars in the manner described above. Any form of mechanism may be employed for rotating the turntable 5 about the bearing 4 to present the desired size or weight of cheese or the like to the action of the cutting blade 10, the form of operating mechanism shown and described in my patent above referred to, however, being particularly well adapted for this purpose.

It is to be understood that the forms of my invention herein shown and described are to be taken as preferred examples of the same and that various changes in the shape, size and arrangement of parts may be resorted to without departing from the spirit of the invention or the scope of the subjoined claims.

Having thus described my invention, I claim:—

1. A device of the character described comprising a cabinet, a vertically-extending bar member mounted for reciprocation on one side of the cabinet, a cutter blade carried at the upper end of said bar member and overlying the cabinet, a second vertically extending bar member mounted for reciprocation on a side of the cabinet opposite said first-mentioned bar member, a protective cover carried at the upper end of said second bar member and overlying the cabinet and cutter blade, and means connecting the bar members to effect their simultaneous movement, whereby to cut the cheese and at the same time elevate the cover.

2. A device of the character described comprising a cabinet, a vertically-extending bar member mounted for reciprocation through the top of the cabinet, a cutter blade carried at the upper end of said bar member and overlying the cabinet, a second vertically extending bar member mounted for reciprocation through the top of the cabinet and provided with a slotted upper end, a protective cover carried at the upper end of said second bar member, fastening means carried by said cover and cooperating with the slotted end of the said second bar member to maintain the cover in position, and means connecting said bar members to effect their simultaneous movement whereby to cut the cheese resting on the cabinet and at the same time elevate the cover.

3. A device of the character described comprising a cabinet a vertically-extending bar member mounted for reciprocation through the top of the cabinet, a cutter blade carried at the upper end of said bar member and overlying the cabinet, a second vertically extending bar member mounted for reciprocation through the top of the cabinet, a supporting member secured to said second vertically-extending bar member, a protective cover above said cabinet having its edge resting on the supporting member, and means to effect the simultaneous movement of the bar members, whereby to cut the cheese and at the same time elevate the cover.

4. A device of the character described comprising a cabinet, a vertically extending bar member mounted for reciprocation through the top of the cabinet, a cutter blade carried at the upper end of said bar member and overlying the cabinet, a second vertically extending bar member mounted for reciprocation through the top of the cabinet, a semi-circular supporting member secured to said second vertically extending bar member, an annular protective cover above said cabinet with its lower edge resting on said semi-circular supporting member and its upper edge secured to the top of said second vertically extending bar member, and means to effect the simultaneous movement of the bar members whereby to cut the cheese and at the same time elevate the cover.

5. A device of the character described comprising a cabinet, a vertically-extending bar member projecting through the cabinet top, a supporting member U-shaped in cross section secured to the bar above the cabinet top, a protective cover positioned above the cabinet top with its lower edge resting in the U-shaped supporting member, and means for causing the elevation of the bar and the protective cover carried thereby.

6. A device of the character described comprising a cabinet, a vertically-extending bar member projecting through the cabinet top, a supporting member U-shaped in cross section secured to the bar above the cabinet top, a protective cover positioned above the cabinet top with its lower edge resting in the U-shaped supporting member, fastening means carried by the cover and engaging the upper end of the bar member, and means for causing the elevation of the bar and the protective cover carried thereby.

7. A device of the character described comprising a cabinet, a vertically-extending bar member projecting through the cabinet top and having a forked upper end, a semi-circular channel member secured to the bar above the cabinet top, a protective cover positioned above the cabinet top with its lower edge resting in the semi-circular channel member, a fastening bolt carried by the cover and engaging the forked upper end of the bar member, and means for causing the elevation of the bar and the protective cover carried thereby.

8. A device of the character described comprising a cabinet, a vertically-extending bar member mounted for reciprocation on one side of the cabinet, a cutter blade carried by the bar member above the cabinet top, a second vertically extending bar member mounted for reciprocation on a side of the cabinet opposite said first mentioned bar member, a protective cover carried by said second bar member above the cabinet top and cutter blade, a lever connecting the lower ends of said bar members, and means to cause movement of said lever whereby to simultaneously lower the bar member carrying the cutter blade and to elevate the bar member carrying the protective cover.

9. A device of the character described comprising a cabinet, a vertically-extending bar member mounted for reciprocation through the cabinet top, a cutter blade carried by the bar member above the cabinet top, a second vertically extending bar member mounted for reciprocation through the cabinet top, a protective cover carried by said second bar member above the cabinet top and cutter blade, an inwardly extending arm carried at the lower end of each of said bar members, a lever connected to each of said inwardly extending arms, and means to cause movement of said lever, whereby to simultaneously lower the bar member carrying the cutter blade and to elevate the bar member carrying the protective cover.

10. A device of the character described comprising a cabinet, a vertically extending bar member mounted for reciprocation through the cabinet top, a cutter blade carried by the bar member above the cabinet top, a second vertically extending bar member mounted for reciprocation through the cabinet top, a protective cover carried by said second bar member above the cabinet top and cutter blade, an inwardly extending arm carried at the lower ends of each of said bar members and provided with a horizontal elongated slot, a pivoted lever disposed between said bar members and having pins adapted to enter the slots in said inwardly extending arms, and means to cause an oscillation of said lever whereby to simultaneously lower the bar member carrying the cutter blade and to elevate the bar member carrying the protective cover.

In testimony whereof I hereunto affix my signature.

BENJAMIN F. MUSSER.